US009126810B2

(12) United States Patent
Gschwendtner

(10) Patent No.: US 9,126,810 B2
(45) Date of Patent: Sep. 8, 2015

(54) AUXILIARY BRAKES FOR PASSENGER CONVEYORS

(75) Inventor: Gero Gschwendtner, Vienna (AU)

(73) Assignee: Otis Elevator Company, Farmington, CT (US)

( * ) Notice: Subject to any disclaimer, the term of this patent is extended or adjusted under 35 U.S.C. 154(b) by 0 days.

(21) Appl. No.: 14/356,098

(22) PCT Filed: Jan. 30, 2012

(86) PCT No.: PCT/US2012/023125
§ 371 (c)(1),
(2), (4) Date: May 2, 2014

(87) PCT Pub. No.: WO2013/115771
PCT Pub. Date: Aug. 8, 2013

(65) Prior Publication Data
US 2014/0353113 A1    Dec. 4, 2014

(51) Int. Cl.
*B66B 29/00*   (2006.01)
*B66B 23/00*   (2006.01)
(Continued)

(52) U.S. Cl.
CPC ............... *B66B 23/00* (2013.01); *B66B 29/00* (2013.01); *F16D 49/00* (2013.01); *F16D 63/008* (2013.01);
(Continued)

(58) Field of Classification Search
CPC .............................. B66B 23/00; B66B 29/00
See application file for complete search history.

(56) References Cited

U.S. PATENT DOCUMENTS 2,096,583 A * 10/1937 Handy ..................... 198/323
2,460,017 A *  1/1949 Lautrup et al. ............ 188/69
(Continued)

FOREIGN PATENT DOCUMENTS

| JP | 2001-163561 A | 6/2001 |
| WO | WO 2004-071860 A1 | 8/2004 |
| WO | WO 2009-026536 A1 | 2/2009 |
| WO | WO 2010-147579 A1 | 12/2010 |

OTHER PUBLICATIONS

International Search Report and Written Opinion for Corresponding International Application No. PCT/US12/23125; report dated Jan. 30, 2012.

*Primary Examiner* — Gene Crawford
*Assistant Examiner* — Thomas Randazzo
(74) *Attorney, Agent, or Firm* — Miller, Matthias & Hull LLP

(57) ABSTRACT

Passenger conveyors with auxiliary brake systems are disclosed. The passenger conveyors include a truss that rotatably supports a loop sprocket at one end and a turnaround at an opposite end with an endless loop extending around the loop sprocket and the turnaround. The loop includes a plurality of rollers linked together. The truss is also coupled to a brake bar that has a braking surface, a downstream end and an upstream end. The brake bar is suspended above and biased towards the loop sprocket with the downstream end of the brake bar disposed a greater distance from the loop than the upstream end of the brake bar. A friction bar, which includes a first side that mateably engages the loop when placed onto the loop, is also provided that includes a top. The friction bar is suspended above the loop by an actuator, which is linked to a controller. The controller sends a signal to the actuator to place the first side of the friction bar onto a section of the loop as the section of the loop passes beneath the downstream end of the brake bar. As the friction bar passes between the loop and the brake bar, frictional engagement between the flat side of the friction bar and the braking surface of the brake bar brakes, impedes the movement of or simply stops the loop.

27 Claims, 3 Drawing Sheets

(51) Int. Cl.
  *F16D 49/00* (2006.01)
  *F16D 63/00* (2006.01)
  *F16D 65/14* (2006.01)
  *F16D 121/02* (2012.01)
  *F16D 121/14* (2012.01)
  *F16D 121/18* (2012.01)
(52) U.S. Cl.
  CPC ............ *F16D 65/14* (2013.01); *F16D 2121/02* (2013.01); *F16D 2121/14* (2013.01); *F16D 2121/18* (2013.01); *F16D 2250/0084* (2013.01); *Y10T 29/49716* (2015.01)

(56) References Cited

U.S. PATENT DOCUMENTS

| | | | | |
|---|---|---|---|---|
| 3,469,678 | A * | 9/1969 | Dube et al. | 198/323 |
| 3,666,074 | A * | 5/1972 | Johnson | 198/323 |
| 3,770,096 | A * | 11/1973 | Stohlquist | 198/464.2 |
| 3,830,344 | A * | 8/1974 | Cervenec et al. | 188/171 |
| 4,276,500 | A * | 6/1981 | Sumka et al. | 318/369 |
| 8,109,384 | B2 * | 2/2012 | Pressler et al. | 198/779 |
| 8,146,718 | B2 * | 4/2012 | Wagner | 188/171 |
| 8,534,444 | B2 * | 9/2013 | Senger | 198/323 |

* cited by examiner

AUXILIARY BRAKES FOR PASSENGER CONVEYORS

TECHNICAL FIELD

This disclosure relates generally to passenger conveyors and, more particularly to an auxiliary braking system for a passenger conveyors driven with a loop or belt such as an escalator or moving walkway.

BACKGROUND

Modern buildings may include three types of passenger conveyors, namely elevators, escalators and moving walkways. These devices have made moving within large buildings such as skyscrapers, airports and shopping malls faster and easier. This disclosure is directed towards escalators and moving walkways.

Escalators and moving walkways may occasionally need to be stopped for maintenance or in the case of an emergency, such as when a passenger is experiencing trouble with the system. Under normal circumstances, when an escalator or moving walkway is stopped, two things must occur. First, the motor powering the escalator or walkway, typically a powerful electrical motor, is deactivated. Second, at essentially the same time, a primary brake is applied to prevent movement of the escalator or walkway until it is reactivated for use.

However, in an emergency, or in the case of a system failure, the primary brake may not be operable and/or the deactivation of the motor may not take place. As a result, any unintended continued movement of the escalator or walkway could injure repair personnel, passengers or bystanders. Because of the importance of proper braking, it is typical to equip passenger conveyor systems with a second braking system to compliment the primary braking system, namely, an auxiliary braking system.

While the primary brake is typically located in the drive system and is used for routine stopping and holding of loaded or empty escalators, the auxiliary brake is an additional safety brake, usually found in the main drive assembly in the upper landing area. Auxiliary brakes are activated in accordance with local safety codes when conditions warrant. Both braking systems require space for installation and operation, and also require periodic inspection, repair, and maintenance.

Thus, while braking of a passenger conveyor is important, the way in which braking is accomplished in modern passenger conveyors may be improved to reduce the space requirements and financial cost imposed by dual (i.e., primary and auxiliary) braking systems as well as to improve reliability. To this end, a new auxiliary braking system for personnel conveyors is disclosed.

SUMMARY OF THE DISCLOSURE

In an embodiment, an auxiliary brake system for a chain or belt driven conveyor is disclosed. The auxiliary brake system includes a fixed structure coupled to an endless loop that will typically be in the form of a chain or belt. In the case of an escalator, a loop may be employed as a part of the drive mechanism although an endless belt is a possibility as well. In the case of a moving walkway, a pallet chain or a belt may be employed. The fixed structure is also coupled to a brake bar having a braking surface. The brake bar is spaced from but biased towards the loop. The system also includes a friction bar including a first side that engages the loop when placed onto the loop. The friction bar also includes a second side that engages the brake bar. The friction bar is suspended from the fixed structure by an actuator. The actuator is linked to a controller. The controller sends a signal to the actuator to place the first side of the friction bar onto a first section of the loop as the friction bar passes between the loop and the brake bar. The second side of the friction bar engages the braking surface of the brake bar while the first side of the friction bar frictionally engages the loop and brakes the loop when the first section of the loop passes beneath the brake bar and the second side of the friction bar frictionally engages the braking surface of the brake bar as the first side of the friction bar frictionally engages the loop.

A passenger conveyor with an auxiliary brake system is also disclosed. The passenger conveyor includes a truss having a first end and a second end. The first end rotatably supports the first turnaround. The second end rotatably supports a second turnaround with an endless loop extending around the first and second turnarounds. The truss is also coupled to a brake bar having a braking side, a first (downstream) end and a second (upstream) end. The brake bar is suspended from and biased towards the loop with the first end of the brake bar disposed a greater distance from the loop than the second end of the brake bar. The passenger conveyor also includes a friction bar including a first side that engages the loop when placed onto the loop. The friction bar also includes a second side for frictionally engaging the braking side of the brake bar. The friction bar is suspended from the fixed structure by an actuator. The actuator is linked to a controller. The controller sends a signal to the actuator to place the first side of the friction bar onto a section of the loop as the section of the loop passes beneath the first end of the brake bar. The second side of the friction bar engages the braking surface of the brake bar and stops movement of the loop when the section of the loop passes beneath the first end of the brake bar and engages the brake bar between the first and second ends thereof.

A method for modifying a passenger conveyor with an auxiliary braking system is also disclosed. The passenger conveyor has a truss with a first end and a second end. The first end rotatably supports a first turnaround. The second end rotatably supports a second turnaround with an endless loop extending around the both turnarounds. The passenger conveyor also includes a controller. The method includes coupling a brake bar to the truss with a biasing member that biases the brake bar towards the loop but spaced apart from the loop. The brake bar has a braking surface. The method also includes coupling a friction bar to an actuator. The friction bar includes a first side that engages the loop when placed onto the loop. The friction bar also includes a second side. The actuator maintains the friction bar in a spaced-apart position from the loop when in an inactive state. The method also includes linking the actuator to the controller, detecting the need to brake the passenger conveyor and sending a signal from the controller to the actuator to activate the actuator and place the first side of the friction bar onto a first section of the loop as the first section of the loop passes between the brake bar and the loop thereby causing the second side of the friction bar to frictionally engage the braking surface of the brake bar and stop movement of the loop.

In an embodiment, an auxiliary brake system for a loop, chain or belt driven conveyor is disclosed. The auxiliary brake system includes a fixed structure coupled to an endless loop that will typically be in the form of a chain, a belt or a series of steps or pallets coupled or linked together without the need for a separate chain or belt. If a chain is employed, dual chains may be used with cross-axels connecting the dual chains together. In the case of an escalator, a loop may be employed as a part of the drive mechanism although an endless belt or a loop formed by steps coupled together is a possibility as well. In the case of a moving walkway, a pallet chain, a loop formed by pallets coupled together or a belt may be employed.

This disclosure relates to passenger conveyors having moving steps or treadplate segments linked together as an endless loop or via an endless loop, belt or chain and to one or more coordinated moving handrails for passengers support.

In any one or more of the embodiments described above, the braking surface of the brake bar includes a brake lining.

In any one or more of the embodiments described above, the brake bar is coupled to the truss by at least one spring.

In any one or more of the embodiments described above, the brake bar is coupled to the fixed structure by at least one hydraulic cylinder.

In any one or more of the embodiments described above, the loop includes a plurality of rollers coupled together by links, the first side of the friction bar mateably receiving the plurality of the rollers when the friction bar is placed onto the loop by the actuator upon receiving a signal from the controller.

In any one or more of the embodiments described above, the first side of the friction bar is shaped to mateably engage the loop.

In any one or more of the embodiments described above, the actuator places the friction bar onto the loop under the force of gravity.

In any one or more of the embodiments described above, the actuator places the friction bar onto the loop using a magnetic force.

In any one or more of the embodiments described above, the actuator places the friction bar onto the loop under a bias of a spring.

In any one or more of the embodiments described above, the actuator is a trigger mechanism that drops the friction bar onto the loop upon receiving a release signal from the controller.

In any one or more of the embodiments described above, the passenger conveyor is an escalator or a moving walkway.

In any one or more of the embodiments described above, the loop is selected from the group consisting of a step chain, a pallet chain and a belt.

DETAILED DESCRIPTION

This disclosure relates to passenger conveyors having moving steps or treadplate segments linked together via an endless loop, belt or chain and to one or more coordinated moving handrails for passengers support. Dual loops, belts or chains on either side of a step or pallet are also within the scope of this disclosure. The endless loop may also be a loop of steps or pallets coupled together in an endless loop without a chain(s) or axel(s). The handrails are typically located on either side of the conveyor, within arm's reach of the passengers on the conveyor. Typical embodiments include escalators for vertical movement of people as well as moving walkways for lateral movement of people. Escalators may be used to move people between an unlimited number of contiguous floors in a building while moving walkways may be used to quickly move passengers throughout a large flat space such as between airport terminals in an airport.

The disclosed systems and methods provide improved auxiliary braking systems and methods of retrofitting existing passenger conveyors with such an auxiliary brake system. The described auxiliary brake system may therefore be provided as part of an original installation or as a retrofit to an existing installation.

Figure 1:
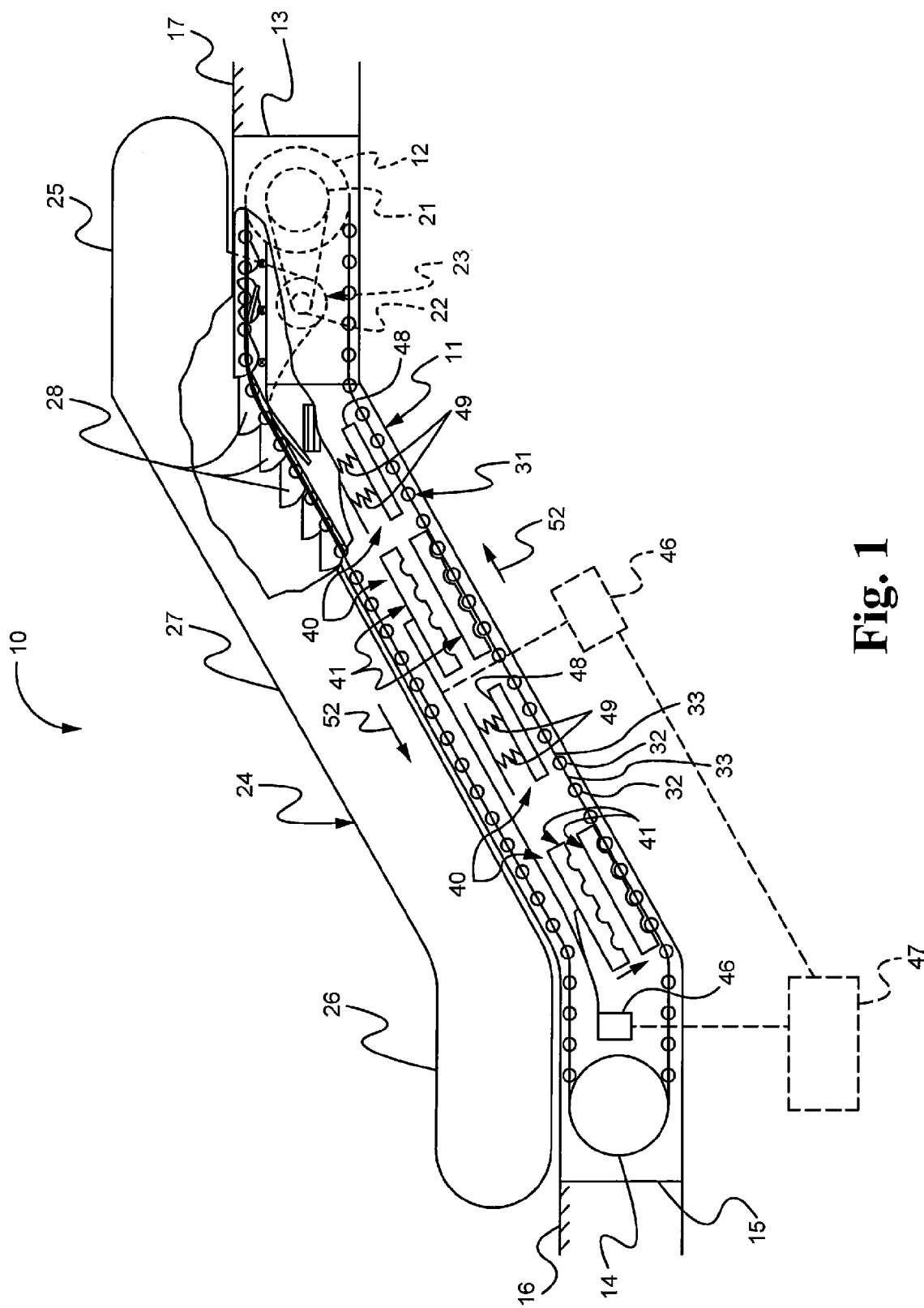
FIG. 1 is a schematic elevational view of an escalator equipped with a plurality of disclosed auxiliary brakes.

Turning now to FIG. 1, the schematic side view of an escalator 10 is shown. The escalator 10 includes a frame or a truss 11 which rotatably supports a first turnaround 12 at a first end 13 of the truss 11 and a second turnaround 14 at a second end 15 of the truss 11. The truss 11 and escalator 10 extend from a lower landing 16 to an upper landing 17.

The escalator 10 also includes a motor or drive system (not shown) which rotates the first turnaround 12 as well as the hand rail drive sprocket 21. The hand rail drive sprocket 21 is coupled to a pulley 22 which forms part of the hand rail drive system 23.

Figure 4:
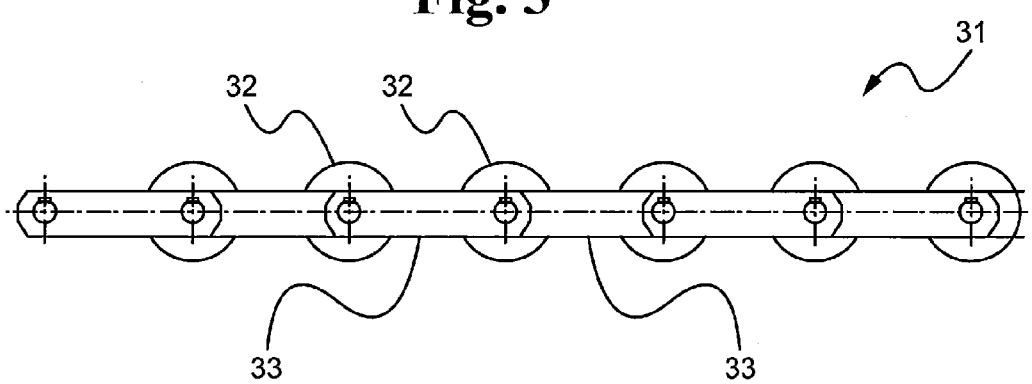
FIG. 4 is a partial view of a loop used to drive an escalator as illustrated in FIG. 1 or a moving walkway.

The endless handrail 24 passes around upper and lower balustrade assemblies 25, 26 and an incline section 27. The steps 28 are coupled to the loop 31, which is illustrated in greater detail in FIG. 4, but if the loop 31 is a step or pallet chain, the loop 31 may includes a plurality of rollers 32 connected by a plurality of links 33. Further, using the example of a step or pallet chain, a typical chain may include a pair of parallel, endless loops connected together by transverse axels (not shown) that pass between and help support the steps 28. Further, while the disclosed auxiliary braking system described below is illustrated in connection with the single loop 31 or step chain as shown in FIG. 1, the disclosed auxiliary braking system could be employed on both loops of a dual loop system. Thus, an improved passenger conveyor 10 could include a single auxiliary brake on a single loop, a pair of auxiliary brakes, one on each loop, multiple auxiliary brakes on a single loop or multiple auxiliary brakes on each loop of a dual loop system.

The endless handrail 24 passes around upper and lower balustrade assemblies 25, 26 and an incline section 27. The steps 28 are coupled to the loop 31, which is illustrated in greater detail in FIG. 4, but if the loop 31 is a step or pallet chain, the loop 31 may includes a plurality of rollers 32 connected by a plurality of links 33. Further, using the example of a step or pallet chain, a typical chain may include a pair of parallel, endless loops connected together by transverse axels (not shown) or the step itself may pass between and help support the steps 28. Thus, while only a single loop 31 is illustrated in FIG. 1, it will be understood that this disclosure is applicable to passenger conveyors that include dual loops, chains or belts connected together by steps, pallets or transverse axels.

Figure 3:
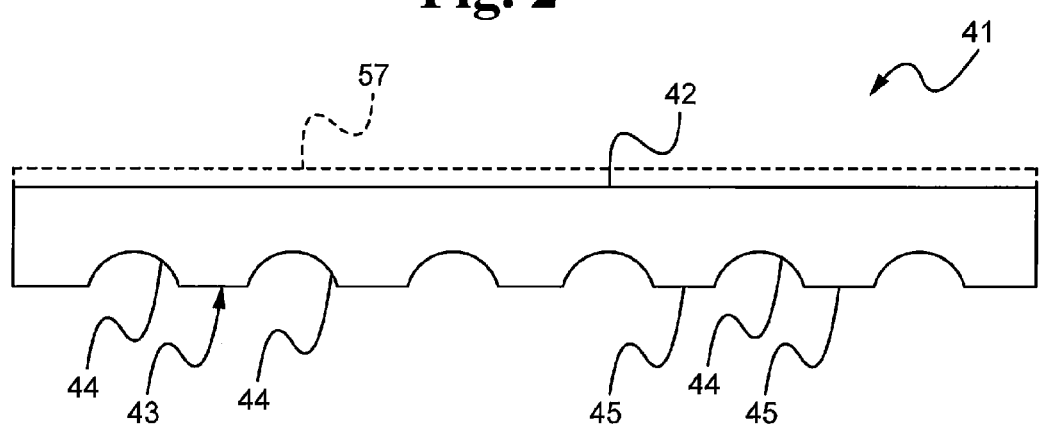
FIG. 3 is a front plan view of the friction bar of the disclosed auxiliary brake system.

Turning to the auxiliary brakes 40 shown in FIG. 1, each auxiliary brake 40 includes a friction bar 41 shown in phantom in a suspended position above the loop 31 and in solid lines after the friction bar has been placed, dropped or pressed onto the loop 31 as illustrated in FIG. 1. Referring to FIGS. 1 and 3, the friction bar 41 includes a flat second side 42 and a first side 43 with a plurality of recesses 44 or other frictional elements disposed thereon that, in the example of FIG. 1, accommodate the rollers 32 when the friction bar 41 is placed onto the loop 31. Flat portions 45 disposed between the recesses 44 of the friction bar 41 accommodate the length of the links 33 as shown when comparing FIGS. 3 and 4.

The friction bar 41 may be suspended above or below the loop by an actuator 46. Either a single actuator 46 may be employed for multiple auxiliary brakes 40 or a single actuator 46 may be employed for each auxiliary brake 40. The actuator or actuators 46 may suspend the friction bars 41 above the loop 31 and release or drop the friction bars 41 onto the loop 31 when the actuator or actuators 46 receive a signal from the controller 47. The means for suspending the friction bar 41 above or below the loop 31 may vary greatly and may include various types of mechanical or magnetic release mechanisms. The actuator 46 may be a mechanical or magnetic release mechanism. The friction bar 41 may be guided onto the loop 31 by tracks, a frame or other guiding means. Once the controller 47 has determined that an emergency situation has arisen or that the one or more auxiliary brakes 40 must be employed, the controller 47 sends a signal to the actuator or actuators 46, which place the friction bars 41 onto the loop 31.

It will also be noted that the friction bars 41 could be suspended below a portion of the loop 31 and pressed upward against the force of gravity to the loop 31 by the actuator 46. The brake bar(s) 48 could also be disposed below the loop 31. Thus, use of the terms "top", "bottom", or "underside" are relation terms used to assist the reader in understanding the drawings. Further, while FIG. 1 illustrates the use of the friction bars 41 on the lower inclined portion of the loop 31, the shape bars could also be placed on top of or beneath the upper inclined portion of the loop 31.

After the controller 47 has instructed the actuator or actuators 46 to place the friction bar or friction bars 41 onto the moving loop 31, the friction bar or bars 41 proceed between the brake bars 48 and the loop 31. The brake bars 48 are coupled to the truss 11 by one or more biasing members 49. The biasing members 49 may be springs, hydraulic cylinders, threaded shafts or other preferably adjustable means for holding or suspending the brake bars 48 a predetermined distance above (or below) the loop 31. The positioning of the brake bars 48 from the loop 31 is intended to receive the forward or front ends of the friction bars 41 so the braking side 51 of the brake bar 48 frictionally engages the flat or second side 42 of the friction bar 41 as the friction bar 41 is carried by the loop 31 beneath the brake bar 48.

Figure 2:
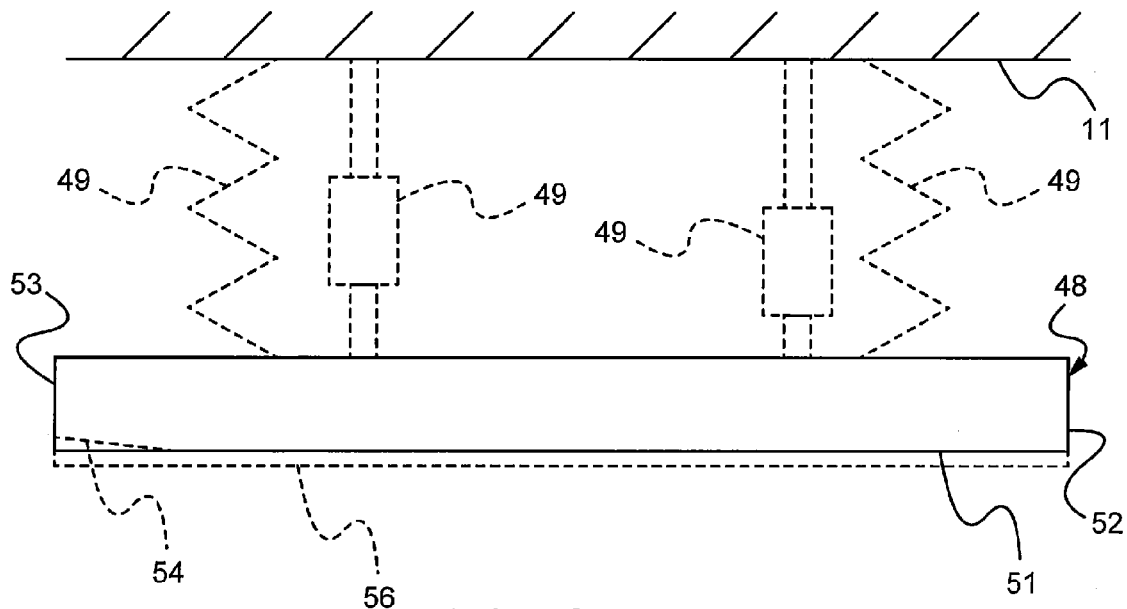
FIG. 2 is a front plan view of a brake bar schematically showing a connection or coupling between the brake bar and a fixed structure, such as a truss.

In the example illustrated in FIG. 1, the loop 31 is moving in the direction of the arrows 52. The brake bar 48 may also include an upstream end 52 and a downstream end 53. The downstream end 53 may be spaced apart from the loop 31 by a slightly greater distance than the upstream end 52 of the brake bar 48, thereby enabling easy reception of the friction bar 41 between the loop 31 and the braking side 51 of the brake bar 48. Another option may be to provide a recess 54 in the braking side 51 of the brake bar 48 near the downstream end 53 of the brake bar 48 to facilitate reception of the friction bar 41 between the brake bar 48 and the loop 31. As shown in FIG. 2, the brake bar 48 is coupled to a fixed portion of the truss 11. The loop 31 is also engaged with a guide surface that provides sufficient reaction force for the braking to take place.

Thus, when needed for maintenance or emergency reasons, the auxiliary brakes 40 may be activated by a signal from the controller 47 that has either detected an emergency problem or received an instruction to activate the one or more auxiliary brakes 40. A signal is sent to the one or more actuators 46, which then place the first side 43 of the friction bar 41 onto the loop 31. The recesses 44 of the friction bar 41 accommodate the rollers 32 of the loop 31 and the friction bar 41, now released from the actuator 46, travels with the loop 31 towards a brake bar 48. The brake bar 48 is secured to the truss 11 and receives the friction bar 41 between the braking side 51 of the brake bar 48 and the loop 31. Frictional engagement between the flat side 42 of the friction bar 41 and the braking side 51 of the brake bar 48 brakes, impedes the movement of, or stops the loop 31. The braking side 51 of the brake bar 48 may be equipped with a brake lining 56 and/or the flat side 42 of the friction bar 41 may be equipped with a brake lining 57. One or two brake linings 56, 57 may be employed.

Figure 5:
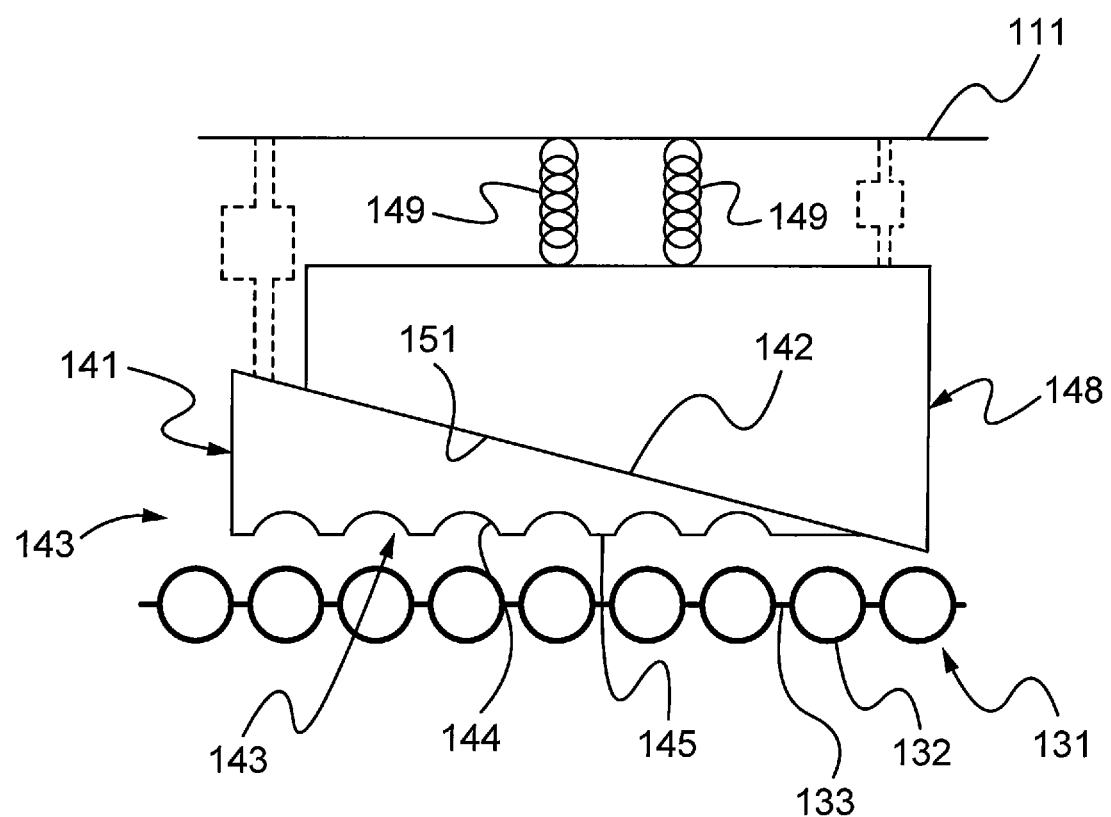
FIG. 5 is a partial view of a loop and an elevational view of an alternative auxiliary braking system.

In FIG. 5, an alternative auxiliary brake 140 is shown with a wedge-shaped brake bar 148 spaced apart from the truss 111 by one or more springs or biasing members 149 or one or more hydraulic or motorized actuators, also shown at 149 in FIG. 5. After the recesses 144 of the shaped side 143 of the wedge-shaped friction bar 141 have been placed onto the rollers 132 of the loop 131 (and the flat portions 145 abuttingly engage the links 133), the second side 142 of the friction bar 141 engages the braking surface 151 of the braking bar 148 to stop the loop 131.

Industrial Applicability

The disclosed auxiliary brakes 40 may be provided as original equipment or as a retrofit to existing passenger conveyors 10. One or more actuators and friction bars 41 may be placed within the truss 11, either above or below a section of the loop 31 to be braked. Similarly, the brake bars 48 may be fixedly coupled to the truss 11, either above or below the section of the loop 31 to be braked. The actuator 46 may be controlled by a separate controller 47 or the controller 47 may be the master controller for the passenger conveyor 10.

In an embodiment, the actuator 46 may rely upon gravity to place the friction bar 41 on the loop 31. This design may be more reliable in the case of a power outage. Various means for adjustably fixing the brake bars 48 to the truss 11 so that the friction bars 41 are fixedly received beneath the brake bars 48 will be apparent to those skilled in the art and are too numerous to mention here. To retrofit an existing passenger conveyor with one or more of the disclosed auxiliary brakes 40 includes coupling the brake bar 48 to the truss 11 with a biasing member 49 that biases the brake bar 48 towards the loop 31, but above (or below) the loop 31. Such a retrofit method would also include coupling a friction bar 41 as described above to an actuator 46, which has also been coupled to are disposed within the truss 11. The friction bar 41 includes a first side 43 with recesses 44 and flat sections 45 that enable the friction bar 41 to mateably engage the loop 31 when placed thereon. The actuator 46 is linked to the controller 47 which has been programmed to send a signal to the actuator 46 to place, drop or position the friction bar 41 onto a section of the loop 31 as the section of the loop 31 passes beneath the brake bar 48 disposed upstream of the actuator 46 and the an initial position of the friction bar 41 friction bar.

What is claimed is:

1. An auxiliary brake system for a chain driven device, the auxiliary brake system comprising:
   a fixed structure coupled to an endless loop,
   the fixed structure also coupled to a brake bar having a braking surface, the brake bar spaced apart from and biased towards the loop,
   a friction bar including a first side that engages the loop when placed onto the loop, the friction bar also including a second side, the friction bar spaced apart from the loop by an actuator, the actuator linked to a controller, the controller sending a signal to the actuator to place the first side of the friction bar onto a first section of the loop,
   wherein the second side of the friction bar engages the braking surface of the brake bar and brakes the loop.

2. The auxiliary brake system of claim 1 wherein the braking surface of the brake bar includes a brake lining.

3. The auxiliary brake system of claim 1 wherein the brake bar is coupled to the truss by at least one spring.

4. The auxiliary brake system of claim 1 wherein the brake bar is coupled to the fixed structure by at least one hydraulic cylinder.

5. The auxiliary brake system of claim 1 wherein the loop includes a plurality of rollers coupled together by links, the first side of the friction bar mateably receiving the plurality of the rollers when the friction bar is placed onto the loop by the actuator upon receiving a signal from the controller.

6. The auxiliary brake system of claim 1 wherein the first side of the friction bar is shaped to mateably engage the loop.

7. The auxiliary brake system of claim 1 wherein the actuator places the friction bar onto the loop under the force of gravity.

8. The auxiliary brake system of claim 1 wherein the actuator places the friction bar onto the loop using a magnetic force.

9. The auxiliary brake system of claim 1 wherein the actuator places the friction bar onto the loop under a bias of a spring.

10. An escalator comprising the loop and the auxiliary brake system of claim 1.

11. A moving walkway comprising the loop and auxiliary brake system of claim 1.

12. The auxiliary brake system of claim 1 wherein the actuator is a trigger mechanism that drops the friction bar onto the loop upon receiving a release signal from the controller.

13. A passenger conveyor with an auxiliary brake system, the passenger conveyor comprising:
a truss having a first end and a second end, the first end rotatably supporting a first turnaround, the second end rotatably supporting a second turnaround with an endless loop extending around the first and second turnarounds, the truss also coupled to a brake bar having an braking surface, a first end and a second end, the brake bar spaced apart from and biased towards the loop with the first end of the brake bar disposed a greater distance from the loop than the second end of the brake bar,
a friction bar including a first side that frictionally engages the loop when placed onto the loop, the friction bar also including a second side, the friction bar spaced apart from the loop by an actuator, the actuator linked to a controller, the controller sending a signal to the actuator to place the first side of the friction bar onto the loop as the friction bar passes between the first end of the brake bar and the loop,
wherein the second side of the friction bar engages the braking surface of the brake bar and brakes movement of the loop as the section of the loop passes beneath the first end of brake bar and engages the brake bar between the first and second ends thereof.

14. The passenger conveyor of claim 13 wherein the braking surface of the brake bar includes a brake lining.

15. The passenger conveyor of claim 13 wherein the passenger conveyor is an escalator.

16. The passenger conveyor of claim 13 wherein the passenger conveyor is a moving walkway.

17. The passenger conveyor of claim 13 wherein the brake bar is coupled to the truss by at least one spring.

18. The passenger conveyor of claim 13 wherein the brake bar is coupled to the truss by a pair of springs, one of the springs being coupled to the brake bar in close proximity to the first end of the brake bar and the other spring being coupled to the brake bar in close proximity to the second end of the brake bar.

19. The passenger conveyor of claim 13 wherein the brake bar is coupled to the truss by at least one hydraulic cylinder.

20. The passenger conveyor of claim 13 wherein the brake bar is coupled to the truss by a pair of hydraulic cylinders, one of the cylinders being coupled to the brake bar in close proximity to the first end of the brake bar and the other cylinder being coupled to the brake bar in close proximity to the second end of the brake bar.

21. The passenger conveyor of claim 13 wherein the loop includes a plurality of rollers coupled together by links, the first side of the friction bar mateably receiving the plurality of the rollers when the friction bar is placed onto the loop by the actuator upon receiving a signal from the controller.

22. The passenger conveyor of claim 13 wherein the actuator is a trigger mechanism that drops the friction bar onto the loop upon receiving a release signal from the controller.

23. The passenger conveyor of claim 13 wherein the loop is selected from the group consisting of a step chain, a pallet chain and a belt.

24. A method for modifying a passenger conveyor with an auxiliary braking system, the passenger conveyor having a truss with a first end and a second end, the first end rotatably supporting a first turnaround, the second end rotatably supporting a second turnaround with an endless loop extending around the first and second turnarounds, the passenger conveyor also including a controller, the method comprising:
coupling a brake bar to the truss with a biasing member that biases the brake bar towards the loop, the brake bar having a braking surface,
coupling a friction bar to an actuator, the friction bar including a first side that engages the loop when placed onto the loop, the friction bar also including a second side, the actuator spacing the friction bar from the loop when in an inactive state,
linking the actuator to the controller,
programming the controller to send a signal to the actuator to activate the actuator and place the first side of the friction bar onto a first section of the loop as the first section of the loop passes beneath the brake bar thereby causing the top of the friction bar to frictionally engage the braking surface of the brake bar and brake movement of the loop.

25. The method of claim 24 wherein the brake bar is coupled to the truss by at least one spring.

26. The method of claim 24 wherein the loop includes a plurality of rollers coupled together by links, the first side of the friction bar mateably receiving the plurality of the rollers when the friction bar is placed onto the loop by the actuator upon receiving a signal from the controller.

27. The method of claim 24 wherein the actuator is a trigger mechanism that drops the friction bar onto the loop upon receiving a release signal from the controller.

* * * * *